United States Patent
Vaudreuil (10) Patent No.: US 7,194,273 B2
(45) Date of Patent: Mar. 20, 2007

(54) LOCATION BASED SERVICE RESTRICTIONS FOR MOBILE APPLICATIONS

(75) Inventor: Gregory M. Vaudreuil, Dallas, TX (US)

(73) Assignee: Lucent Technologies Inc., Murray Hill, NJ (US)

( * ) Notice: Subject to any disclaimer, the term of this patent is extended or adjusted under 35 U.S.C. 154(b) by 131 days.

(21) Appl. No.: 10/778,461

(22) Filed: Feb. 12, 2004

(65) Prior Publication Data

US 2005/0181808 A1  Aug. 18, 2005

(51) Int. Cl.
*H04Q 7/20* (2006.01)

(52) U.S. Cl. .................. 455/456.3; 455/456.4; 455/419; 455/69

(58) Field of Classification Search ............. 455/456.4, 455/419, 69
See application file for complete search history.

(56) References Cited

U.S. PATENT DOCUMENTS

| | | | | |
|---|---|---|---|---|
| 5,594,947 A | * | 1/1997 | Grube et al. ................. | 455/509 |
| 5,982,324 A | * | 11/1999 | Watters et al. ......... | 342/357.06 |
| 6,011,973 A | * | 1/2000 | Valentine et al. ........ | 455/456.6 |
| 6,081,731 A | * | 6/2000 | Boltz et al. ................. | 455/565 |
| 6,201,973 B1 | * | 3/2001 | Kowaguchi .............. | 455/456.6 |
| 6,230,017 B1 | * | 5/2001 | Andersson et al. ...... | 455/456.6 |
| 6,556,810 B2 | * | 4/2003 | Suzuki ........................ | 455/88 |
| 6,615,048 B1 | * | 9/2003 | Hayashi ................... | 455/456.3 |
| 6,782,266 B2 | * | 8/2004 | Baer et al. ................ | 455/456.4 |
| 6,907,254 B1 | * | 6/2005 | Westfield ................. | 455/456.4 |
| 2002/0077118 A1 | * | 6/2002 | Zellner et al. ............. | 455/456 |
| 2002/0090953 A1 | * | 7/2002 | Aburai et al. ............... | 455/456 |
| 2002/0142754 A1 | * | 10/2002 | Takatori ..................... | 455/411 |
| 2003/0125014 A1 | * | 7/2003 | Inukai et al. ............... | 455/410 |

* cited by examiner

*Primary Examiner*—Lester Kincaid
*Assistant Examiner*—Diego Herrera (57) ABSTRACT

A cell phone system that controls the functionality of cell phones based upon their geographical locations. Functionality information stored in data bases located at and unique to each location. A local or low power transmitter at each location transmits functionality information from the data bases to cell phones currently at the locations. Alternatively, a single data base common to the entire network is used to store functionality information for a plurality of locations. The geographical location of active cell phones is monitored and when a cell phone enters a restricted location, cell phone location information is transmitted to the network data base to read it out and transmit the applicable functionality information to cell phones. The functionality information may represent voluntary restrictions displayed on the cell phones or they may be mandatory restrictions that inhibit cell phone functions defined by the restrictions.

18 Claims, 7 Drawing Sheets

LOCATION BASED SERVICE RESTRICTIONS FOR MOBILE APPLICATIONS

FIELD OF THE INVENTION

This invention relates to mobile communication systems and in particular to a cell phone system for controlling the functionality of cellular phones and the like based upon their location. This invention further relates to a cellular system having the capability of imposing service restrictions on the cell phones based upon their location. The invention further relates to a cell phone system for advising cell phone users of services restrictions specific to their current cell phone location.

PROBLEM

Mobile telephone systems, in particular cell phone systems, are in widespread use throughout the world. They have revolutionized communication by enabling users to communicate at any time and from any place. Cell phone users can communicate with each other or with users of other types of communication systems such as landline systems and the like. Cell phones are convenient to use, their use and popularity is growing at an exponential rate, their functionality is increasing, and more communications functions are being incorporated into the cell phones. Examples of this increasing functionality include the incorporation of functions such as speaker cell phone, camera cell phone, dictation, data storage, call forwarding, caller ID, databases, keyboards, computer functions, and internet access, etc. The increasing availability of cell phones with expanded functionality is revolutionizing the manner in which users communicate and the functionality available to them when communicating.

While this advance in the art of cell phone communications is finding ever increasing popularity, its use has created its own set of problems. The ringing of a cell phone in public places, such as restaurants, churches, and theatres, is an annoyance. The owners of such locations have been forced to display signs requesting that cell phones be turned off or their ringers be deactivated. In some cases, the owners of such locations have collected cell phones from their owners before permitting them to patronize their establishments. The use of cell phones while driving is a safety hazard and is prohibited in many states. The use of speaker cell phones is often an annoyance to others. The use of a cell phone in a theatre to record a performance is a copyright infringement of the work being performed. The use of a camera cell phone as a miniature TV camera to capture a theatrical performance and transmit it off location via an internet connection is also a copyright violation of the work being performed.

The above and other uses of cell phones disturb those nearby and violate the legal rights of others, such as theatre owners and copyright owners. This is an increasing societal concern and has resulted in rules, regulations, and laws regulating or prohibiting the manner and locations in which cell phones can be used.

It is therefore seen that the increased use and functionality of cell phones has created problems regarding the time, manner and locations in which they can be used without disturbing or violating the rights of others.

SOLUTION

The above and other problems are solved by the present invention in accordance with which cell phone network is provided that controls the functionality of active cell phones based on their current location. If the cell phone is in a location that prohibits ringing, the cell phone's capability to ring is blocked. If the cell phone is at a location that prohibits the use of an enhanced feature such as a camera or audio or video recording, the cell phone's capability is blocked. In accordance with one embodiment of the present invention, the cell phone network contains a database that stores location specific restrictions. The restrictions may include video recording, cell phone ringing, or other prohibited functions. The network uses this stored restriction information to curtail the cell phone operation if it is in a location having such restrictions.

The network may refuse to accept incoming messages sent from a camera cell phone from locations where this feature is prohibited. This prohibits cell phones from broadcasting videos of sports or musical live events. The cell phone system of the invention checks the location of an active cell phone and the restriction database when a service request is received. Any applicable restrictions are then sent to the cell phone to control its operation.

The restriction database and the cell phone network inhibit or enable the enhanced cell phone functions. Thus, a cell phone cannot record unless it receives approval from the network. This is useful in places where recording is not permitted such as restricted factory facilities, theatres, defense locations, or health clubs, or school locker rooms. A form of low level interlock may be used as well as a visual indication on the cell phone that the function is in fact disabled. The restrictions may be aggregated into restriction profiles, each having a set of one or more restrictions and a space definition describing the geographical space in which the restrictions apply.

The restrictions may be communicated to the cell phones in several ways. When a cell phone is activated, the activation may include a query that returns a list of restrictions for the current cell-phone location. This list may include the restriction profiles, or may be a smaller summary of the location descriptions so that the user can query to determine if a restriction is in force in the current location of the user.

The cell phone may query the database when service is requested. That is, when a cell phone function is activated that may be subject to a restriction, the cell phone initiates a query of the restrictions database for the current cell phone location. The restrictions are accomplished by network signaling. For example, a visual or tactile or auditory indication that audio ringing is not permitted may be sent with the inbound call connection, or it may be included in a control information of an audio multimedia message or "push to talk" connection request.

The cell phone location may be determined in several ways. The cell phone may contain an on-board GPS receiver. The cell phone determines its GPS location and sends it to the restriction database and receives back restriction profiles based on its determined GPS current location. In another embodiment, network-based location technology, such as triangulation, may be used to determine the cell phone location when the cell phone requests restriction information. The cell phone location may also be determined by a combination of GPS and triangulation or by any other suitable location technology such as electromagnetic.

The system embodying the present invention can be used for at least the following restrictions:

Quiet zone, no ringing, no push-to-talk (walkie-talkie);
No Speaker phone;
No picture/video zone; no taking of pictures;
No audio recording zone;
No two-way audio communication zone;
Disable of external I/O (such as USB disk connector);
No file copying on premise; and
No radio use (attempts to initiate a radio link are refused, such as in a blasting zone).

These restrictions may be part of a restriction profile:
Profile would contain the location in a 3 dimensional space definition;
Provide X, Y, and Z coordinates of corner boundary markers of the restriction zone;
May include more complex restriction shape definitions as supported by database query technology; and
Restriction may also have a time-based value indicating the time of day such a restriction may be in force (i.e., only during evening hours at a concert venue).

There are several ways this restriction information may be used by the cell phone:
Soft restriction: The restriction is informational to the user. It is used as a courtesy and results in warnings to the user when a prohibited action is attempted. This does not require enforcement. The user is presumed to desire this service, for example, to suppress a ring in a house of worship.
Hard restriction: The cell phone functionality is controlled by the restriction database and the network. This may involve the use of cryptography or other means to lock the cell phone and allow only authorized/certified application to be resident. Such a cell phone may prominently display markings indicating that is so equipped and not tampered with. This allows an employer, entertainment venue, or club to restrict the use of devices that do not comply with restrictions on their locations.
Local restrictions: In accordance with another embodiment, a local or low power radio transmitter may be used to broadcast local restriction profiles without network involvement. This would eliminate the need for a central network restriction database. The cell phone would receive the local profiles from a local transmitter location whose proprietor wishes to define and enforce his own restrictions.

DESCRIPTION OF THE DRAWINGS

The above and other advantages and features of the invention may be better understood from a reading of the following detailed description thereof taken in conjunction with the drawings in which FIG. 1 discloses a first possible exemplary embodiment.

DETAILED DESCRIPTION

Figure 1:
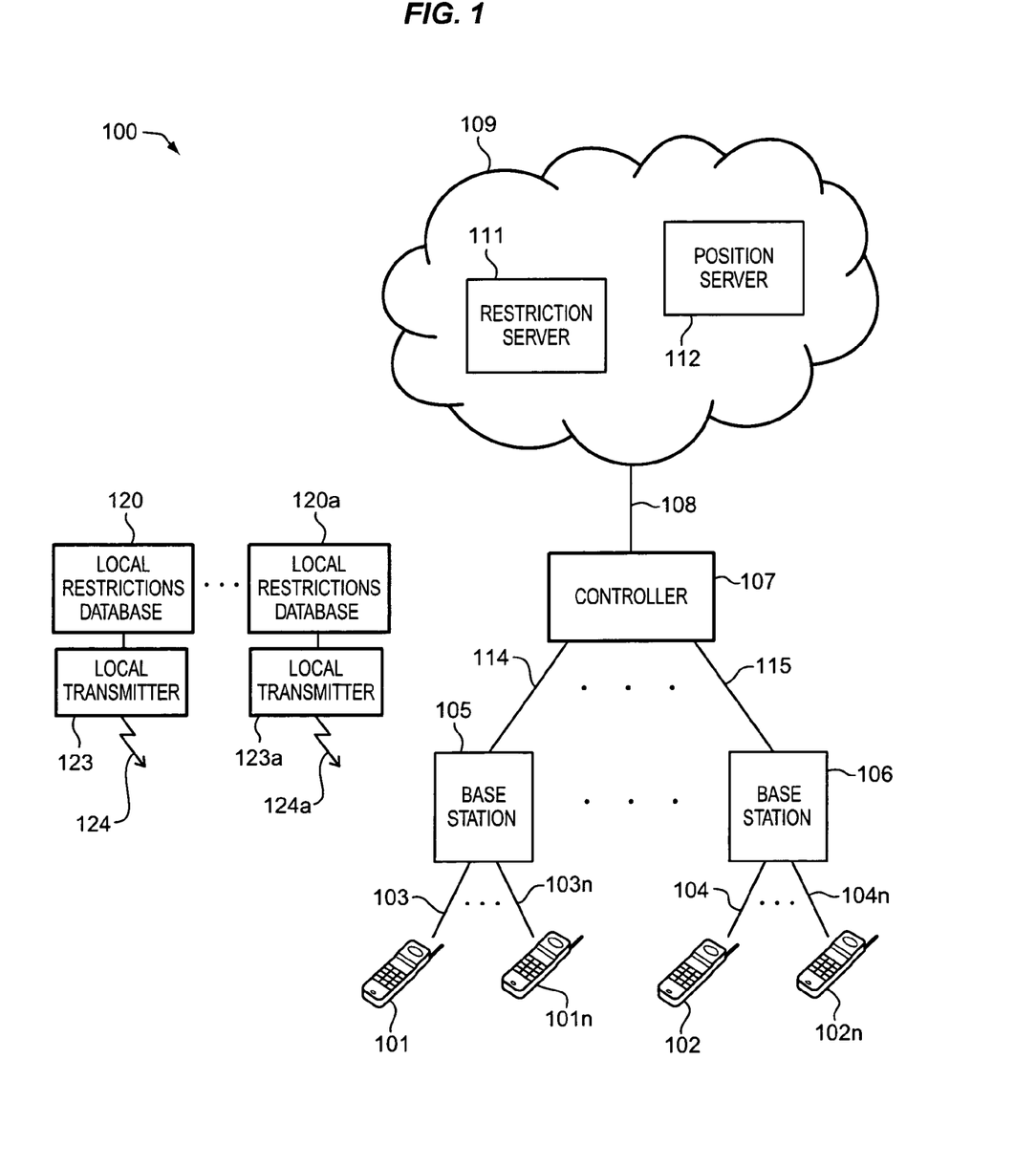

Description of FIG. 1

FIG. 1 discloses a cell phone system 100 embodying the present invention. Shown on FIG. 1 are a plurality of cell phones 101-101n served over paths 103-103n by base station 105 and a plurality of cell phones 102-102n served over paths 104-104n by base station 106. Base stations 105 and 106 are connected via paths 114 and 115, respectively, to controller 107 which is connected via path 108 to element 109 which includes a restriction server 111 and a position server 112. Restriction server 111 comprises a restriction database which stores the restriction information applicable to the various locations specifying the functionality restrictions to be enforced in the use of cell phones at such locations. Position server 112 determines and stores location information for cell phones served by base stations 105 and 106.

Restriction server 111 and position server enable network 100 to receive geographic coordinates representing the current location of each active cell phone from position server 112 as well as the functionality restrictions applicable to the current location of each active cell phone from restriction server 111. This embodiment envisions that the restrictions for each location is provided by the proprietor on the location and communicated to the operator of system 100 who enters the appropriate restrictions into restriction server 111.

Figure 2:
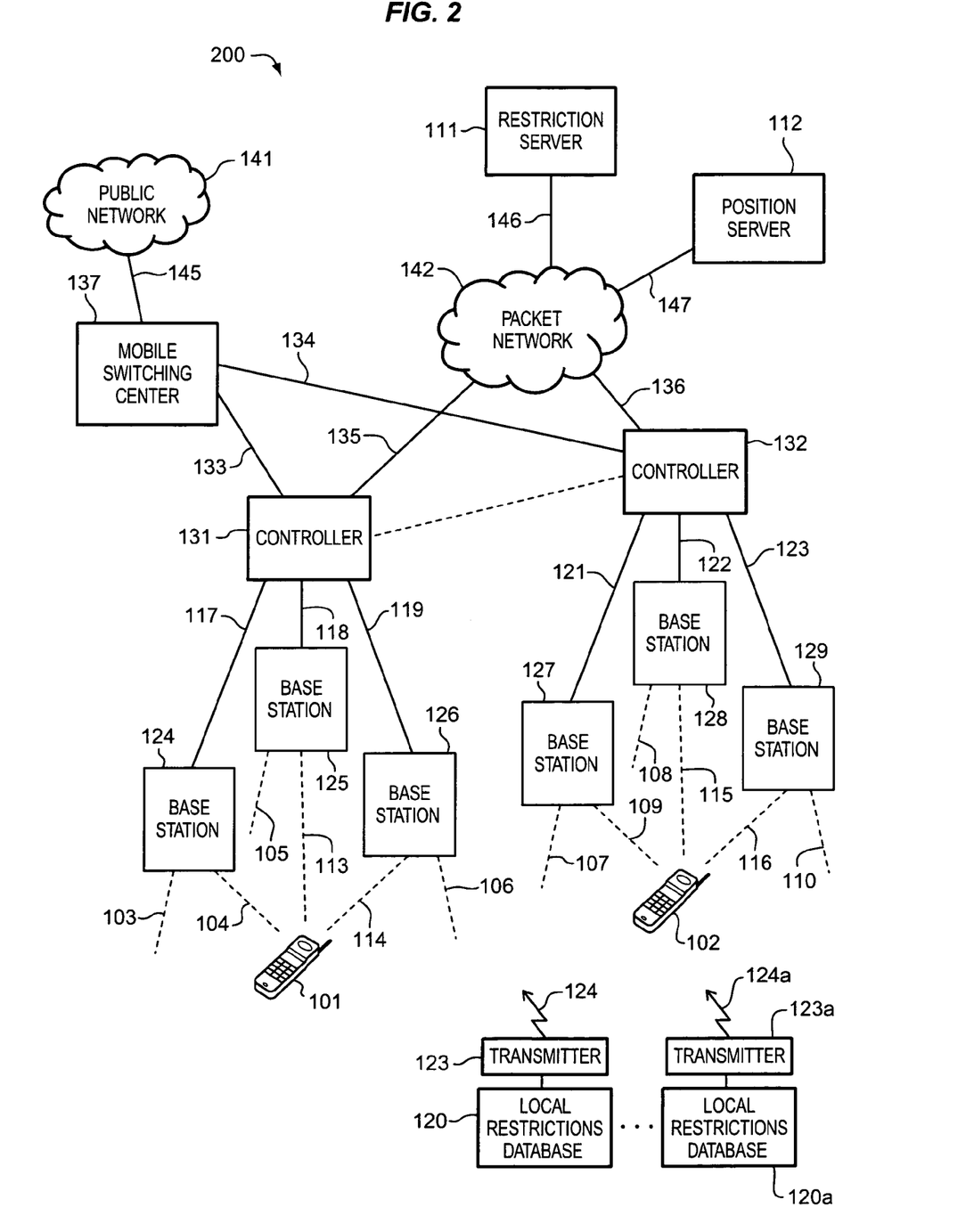
FIG. 2 discloses a second possible exemplary embodiment.

Cell phones served by base stations 105 and 106 operate in the normal manner using their full feature compliment so long as they are not currently in a restricted location as determined by position server 112 and its associated elements shown in further detail in FIG. 2. When an active cell phone is determined to be within the confines of a restricted location, restriction server 111 is read out to determine the restrictions to be applied to the active cell phone. For example, servers 111 and 112 together may determine that a cell phone is currently in a house of worship that has a restriction that ringing not be permitted by cell phones within its confines. In such cases, cloud element 109 causes restriction information to be applied over path 108 to controller 107 which, in turn, causes an appropriate restriction signal to be extended over path 114 or 115 to the base stations 105 or 106 serving the cell phone to which a call is directed. The signal inhibits the cell phone ringer and, at the user's option, either activates a vibrator or sends a message back to the calling party that the call cannot currently be completed.

It is possible that some locations may wish to enforce their own cell phone restrictions independently of the cell phone network. In such cases, elements 120–120a are provided for storing the local restrictions applicable to a location. Each of elements 120–120a is unique to a different location and each contains a location restriction database together with a local transmitter that transmits signals to all cell phones within the confines of its location. For example, the location may be a theatre whose proprietor wishes to prohibit the use of cell phones. In this case, the appropriate restrictions are entered into element 120, for example, which transmits a signal from its transmitter 123 that inhibits the use of any cell phones within the theatre. These restrictions may be time sensitive so that they are enforced only during the duration of a performance within the theatre.

It can be seen from the above that the system 100 of FIG. 1 enables restrictions to be controlled and enforced by the network based upon the current location of an active cell phone with position server 112 storing position information and with restriction server 111 storing the restrictions for the determined position of the cell phone. It can also be seen that local restriction databases 120 and 120a permit an establishment proprietor to determine and enforce local restrictions independent of the cell phone network.

Description of FIG. 2

FIG. 2 discloses further details of system 100 of FIG. 1. Shown on FIG. 2 are a plurality of controllers 131 and 132 each comparable to controller 107 of FIG. 1. Each controller on FIG. 2 serves a plurality of base stations each of which includes an antenna. The base stations served by controller 131 are 124, 125, and 126. The base stations served by controller 132 are 127, 128, and 129. Each base station can concurrently serve a plurality of cell phones. Only cell phones 101 and 102 are being shown on FIG. 2. Each cell phone, such as 101, is shown as being functionally connected by a wireless path, such as 104, 113, and 114 to base stations 124, 125, and 126. The connections represented by paths 104, 113, and 114 from cell phone 101 to base stations 124, 125, and 126 indicate that all of base stations 124, 125, and 126 can receive the cell phone 101 signal based upon its current geographical position but, that one of these base stations is currently preferred for the serving of cell phone 101 based upon its current geographical position.

Restriction server 111 and position server 112 perform the same function and store the same information as priorly described for the correspondingly designated elements on FIG. 1. Controllers 131 and 132 are connected via paths 133 and 134 to mobile switching center 137 which is connected via path 145 to public network 141. This enables the cell phones to receive calls from and to place calls to users served by public network 141. Mobile switching center 137 also enables cell phone users served by controller 131 to receive cell calls from and place calls to cell phone users served by controller 132. Packet/data network 142 enables controllers 131 and 132 to communicate with restriction server 111 and position server 112 so that the geographical position of each currently active cell phone can be determined and the applicable restrictions be applied to the active cell phone.

Figure 3:
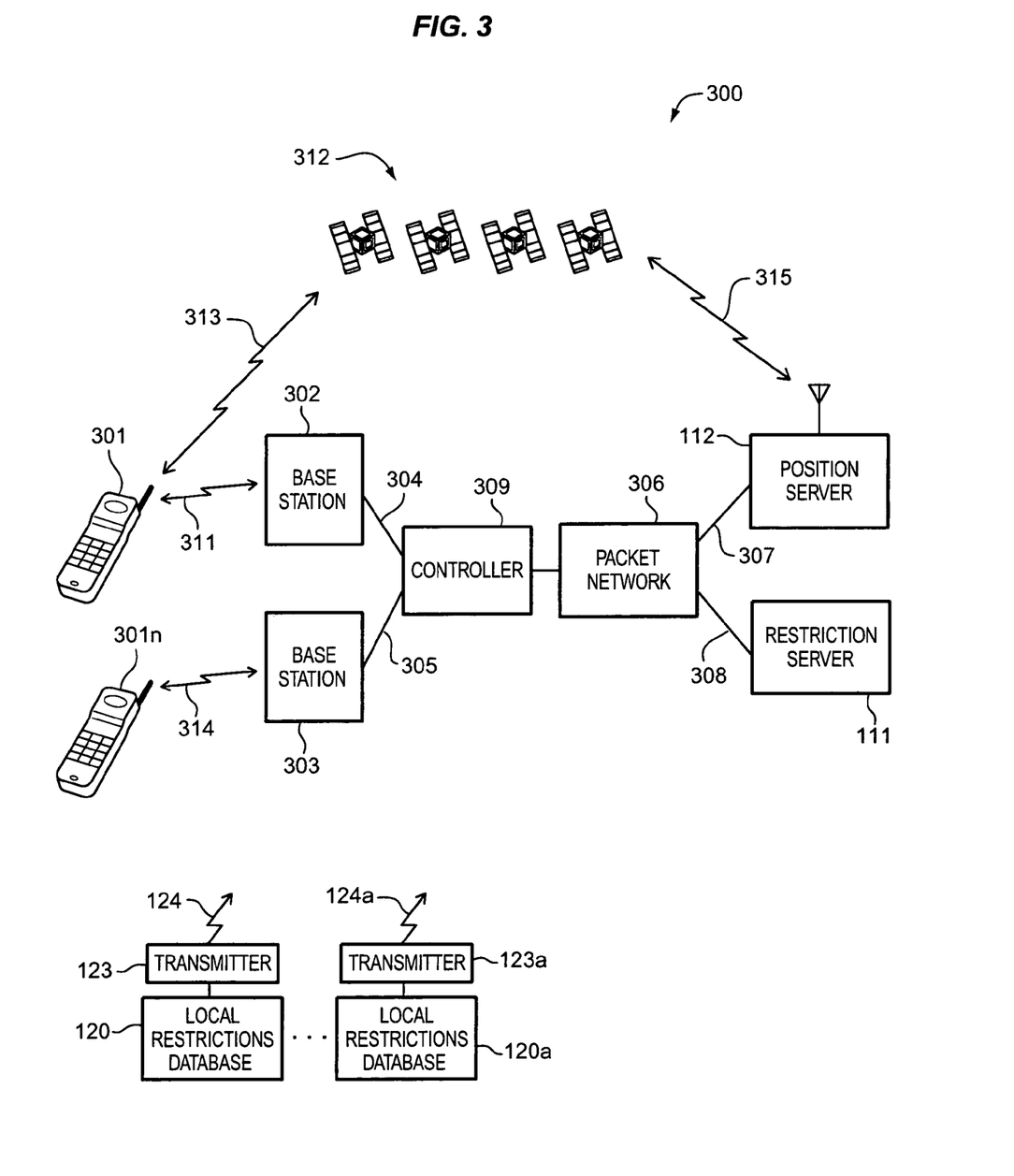
FIG. 3 discloses yet another possible exemplary embodiment.

The position of an active cell phone can be determined either by the use of a global positioning facility as shown on FIG. 3 or it may be determined by the use of well known triangulation facilities internal to the cell phone network. These triangulation facilities operate using signals applied by an active cell phone to the plurality of base stations served by the cell phone. Triangulation may be used to determine the position of cell phone 101 based upon relative strength of its signals with base stations 124, 125 and 126.

Only cell phones 101 and 102 are shown on FIG. 2 in order to minimize complexity. Each base station on FIG. 2 may serve other cell phones. The paths servings these other cell phones are 103, 105, 106, 107, 108 and 110. Local restriction elements 120–120a on FIG. 2 and operate as described in connection with FIG. 1 so that the proprietor of a location may control and enforce restrictions on cell phones within his location.

Description of FIG. 3

FIG. 3 discloses a global positioning system 300 including satellites 312 for determining the geographical position of a currently active cell phone such as 301–301n. FIG. 3 shows a simplified cellular system including a packet network 306 which is connected via controller 309 to a plurality of base stations 302 and 303. Each base station 302 and 303 can serve a plurality of cell phones. FIG. 3 discloses only cell phone 301–301n for reason of simplicity. The current location of each active cell phone is determined by the use of the global positioning system including satellites 312 and the GPS circuits within the cell phone. Satellites 312 can also communicate with position server 112. Each cell phone determines its GPS location by using the satellite signals and transmits this information to position server 112 via base station 302/303, controller 309 and packet network 102. Restriction server 111 stores the applicable restrictions in the same manner as described in connection with the systems of FIG. 1 and FIG. 2.

Servers 112 and 111 communicate over paths 307 and 308 and packet network 306 to receive the position information of an active cell phone as well as to transmit the applicable restrictions to the cell phone. This information is extended via controller 309 over paths 304 and 305 to base stations 302 and 303. The functionality of cell phones 301 and 301n is controlled in the same manner as priorly described in connection with FIG. 1 and FIG. 2. Local restriction elements 120 and 120a store local restriction information for locations under the control of the location proprietor in the same manner as described priorly in connection with the systems of FIG. 1 and FIG. 2.

Figure 4:
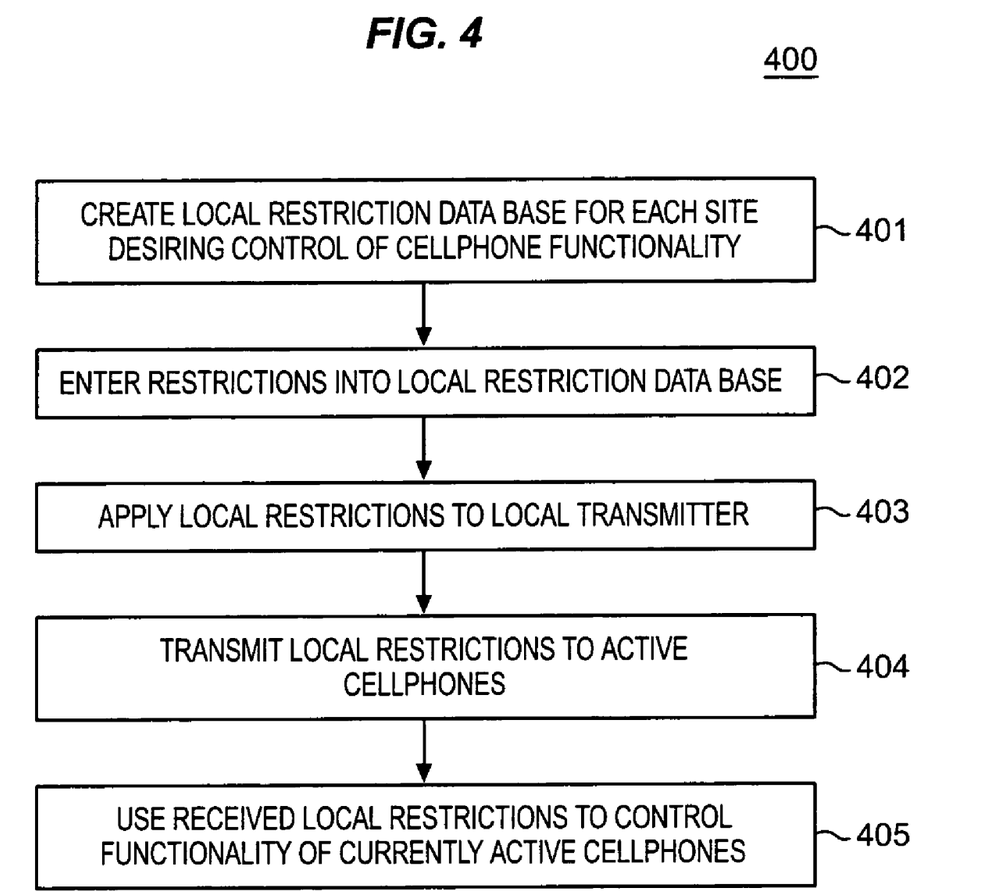
FIGS. 4–7 disclose flow charts of methods embodying the invention.

Description of FIG. 4

FIG. 4 discloses process 400 which define the operation of the local restriction databases 120–120a and associated transmitters 123–123a in controlling the functionality of cell phones currently in locations associated with the local databases. Each local restriction database 120–120a is either on and/or associated with a location whose proprietor desires to exercise control over the cell phones in his location. In so doing, the location proprietor controls the entry of the applicable restrictions into the local restriction database for his location.

The process 400 operates as follows. In step 401, a local restriction database is created for a proprietor who desires control of the cell phone functionality at his location. Step 402 enters the applicable restrictions into a local restriction database, such as element 120. Step 403 applies the local restrictions to a local transmitter 123–123a for the location. Step 404 operates the transmitter to transmit the local restrictions to all active cell phones at the location. In step 405, the local restrictions received by the active cell phones control the functionality of the active cell phones on the location. This control may selectively activate or prohibit the use of certain cell phone functions either on a long term basis or on a short term basis such as the hours of the day during which the various cell phone functions are to be prohibited.

Figure 5:
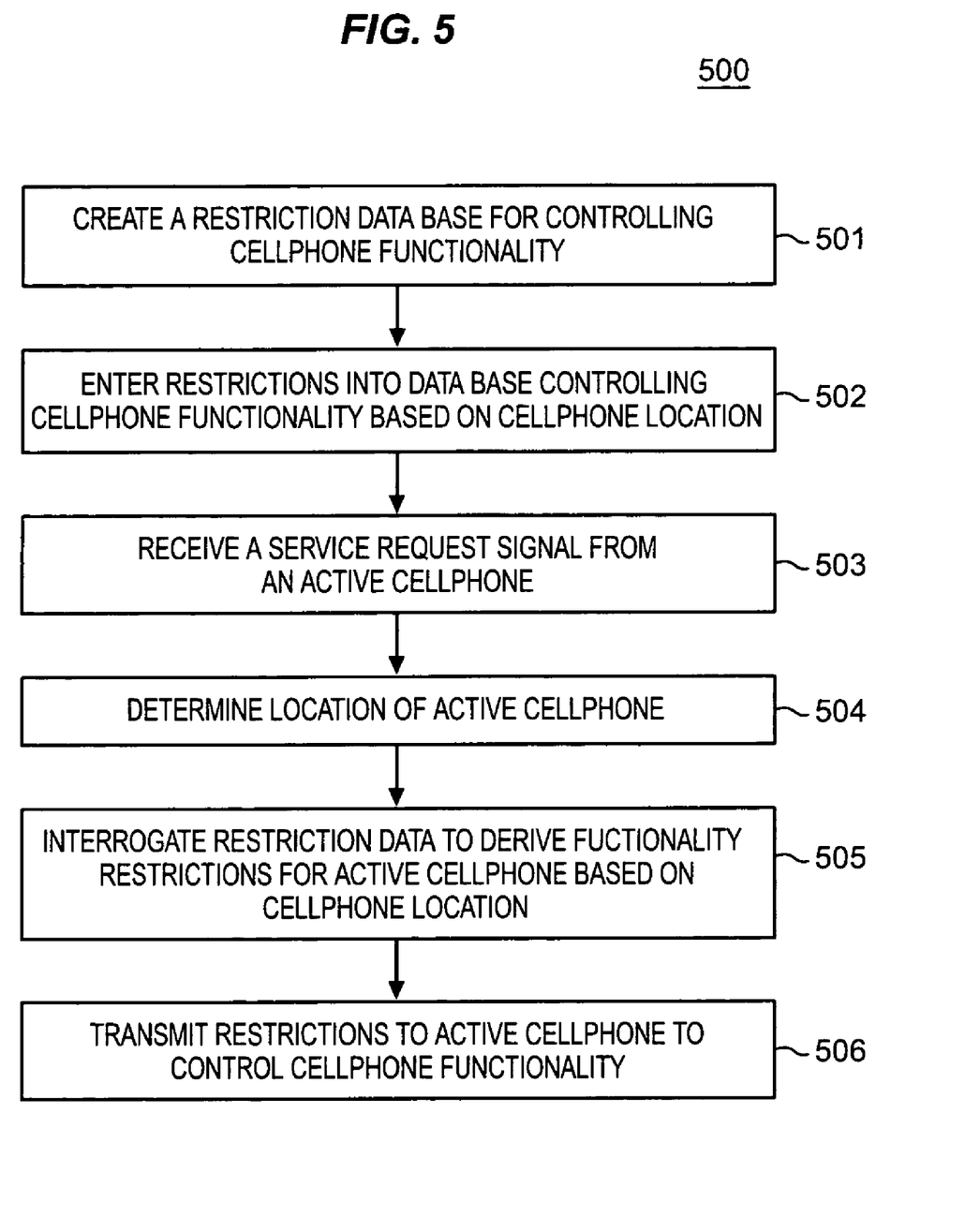
Figure 6:
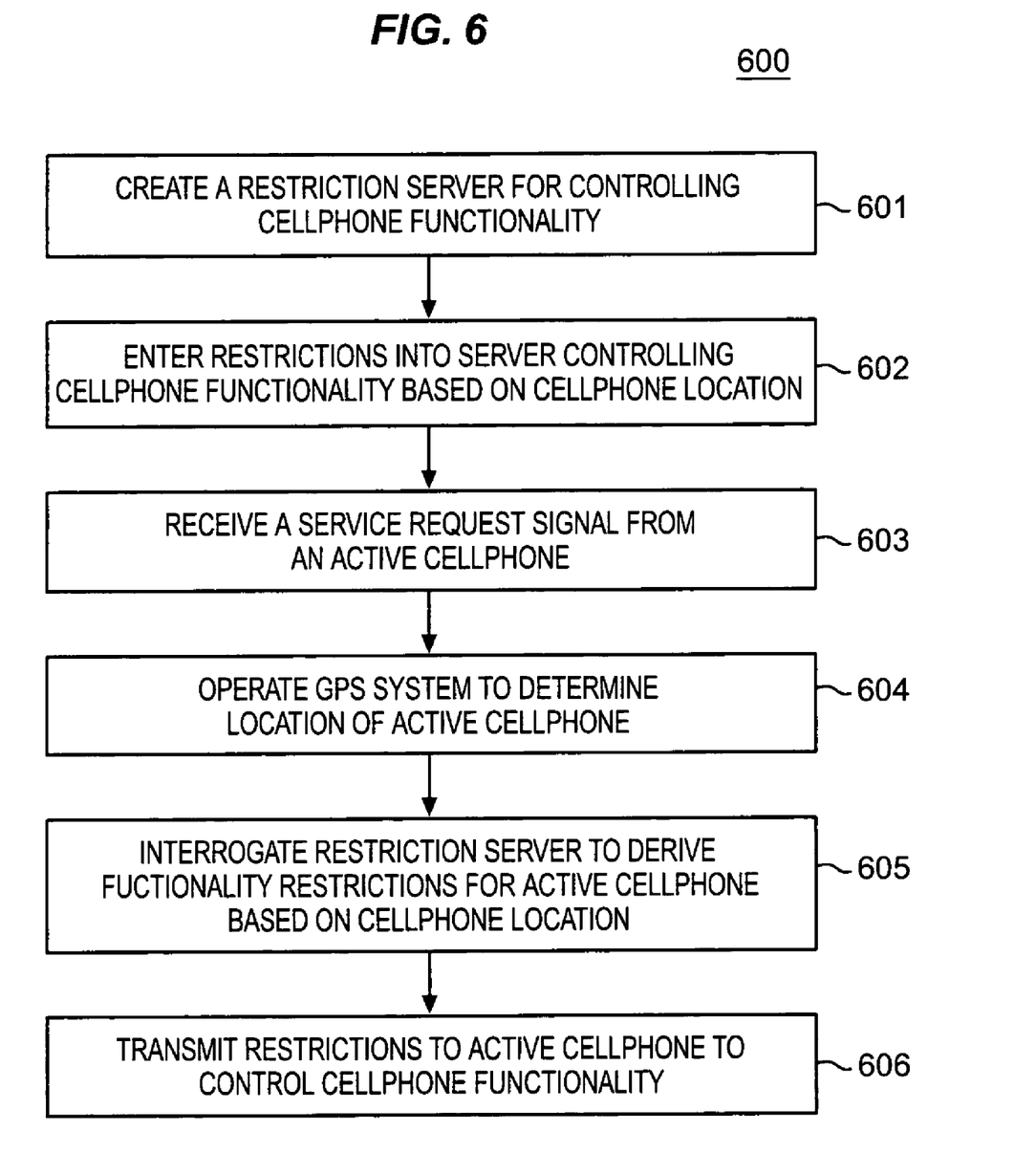
Figure 7:
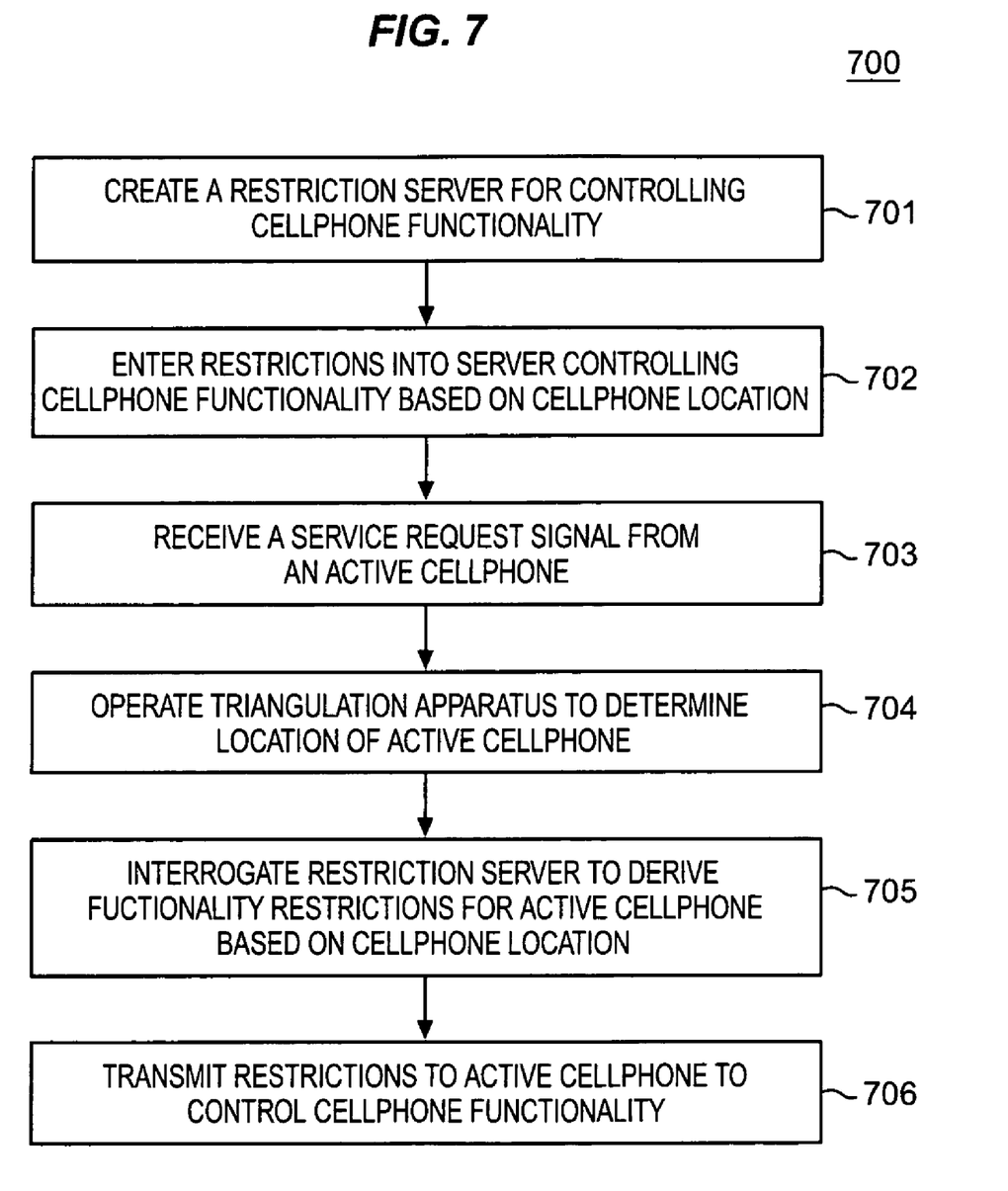

The local restriction databases 120–120a associated with transmitters 123–123a are shown on the embodiments of all of FIGS. 1–3; but they are not shown on or described for the processes of FIG. 5, FIG. 6 and FIG. 7 since they are identical to the process of FIG. 4. The systems of FIGS. 1, 2, and 3 are multifunctional with respect to the restriction control of active cell phones. In the systems of all of FIGS. 1, 2, and 3, the functionality control of active cell phones may be achieved by the use of the local restriction databases 120–120a and associated transmitters 123–123a under direct control of the location proprietor. Alternatively, the restrictions may be provided by the cell phone network facilities such as position server 112 and restriction server 111. Alternatively, the restrictions may be provided jointly by both the local restriction database 120 and by restrictions stored in server 111. In this manner, a location proprietor may control functionality restrictions unique to his business and entered into the local restriction databases 120. Additional restrictions may be enforced by means of restrictions stored in restriction server 111 and the determined cell phone position information provided by position server 112. Such additional restrictions might be those imposed by governmental regulations such as the control of the operation of a cell phone requesting 911 service.

Description of FIG. 5

FIG. 5 discloses process 500 which includes, but does not show the process 400 in FIG. 4. The process of FIG. 5 also enables the network to control the functionality based upon database restrictions as well as the determined location of an active cell phone. Step 501 creates a restriction database in server 111 for controlling the functionality of active cell phones served by the cell phone network. This restriction database is stored in server 111 of FIGS. 1–3. Step 502 enters the applicable restrictions into the restriction server 111. In step 503, the cell phone network receives a service request signal from an active cell phone. Step 504 determines the location of the active cell phone. This location determination may be made by the use of GPS facilities of FIG. 3 and/or by means of triangulation facilities.

Step 505 interrogates restriction server 111 to determine the functionality restrictions for the active cell phone based upon the determined location of the cell phone. Step 506 causes the network to transmit the applicable restrictions to the active cell phones over the network from the restriction server 111, through packet network 142, controller such as 131, and the base station, such as 124, currently serving an active cell phone. The control functionality may selectively permit or prohibit the use of certain cell phone functions either on a long term basis or on a short term basis such as the time of day.

Description of FIG. 6

FIG. 6 discloses a cellular network system 300 which operates in a manner similar to that described for FIG. 2 except that the location of an active cell phone is determined by GPS facilities. Step 601 creates a restriction database in server 111. Step 602 enters the applicable restrictions into restriction server 111 for controlling the functionality of active cell phones served by system 300. In step 603, the network 300 receives a service request from an active cell phone. This service request may include either the initiation of a call by the user at the active cell phone or the reception of a call directed to the active cell phone.

In step 604, the GPS system 312 sends GSP information to the cell phone to determine the cell phone location. In step 605, the restriction server 111 is read out to determine the functionality restrictions to be applied to the active cell phone based upon the cell phone location determined by the GPS system and cell phone circuitry.

In step 606, the determined restrictions are transmitted from server 111 via packet network 306, controller 309, to a base station such as 302 and in turn to cell phone 301 to control the functionality of the various features of cell phone 301. This control may selectively permit or inhibit the use of the various facilities either on a long term basis or on a short term basis, such as the hours of the day during which the service is requested.

Description of FIG. 7

FIG. 7 illustrates a process similar to that of FIG. 6 in which the functionality of an active cell phone is controlled by means of triangulation facilities internal to the cell phone network rather than by the use the GPS facilities of FIG. 6. The functions provided by steps 701–703 of FIG. 7 are identical to those of steps 601–603 of FIG. 6. Step 704 causes the location of an active cell phone to be determined by means of triangulation apparatus internal to the cell phone network including the controller 309. The remainder of the functions provided by process 700 is executed by elements 705 and 706 in the identical manner to those of elements 605 and 606 of FIG. 6.

The above description discloses possible exemplary embodiments of this invention. It is expected that those skilled in the art can and will design alternative embodiments that infringe on this invention as set forth in the claims below literally or through the Doctrine of Equivalents. For example, the term cell phone as used herein shall be understood as including any mobile communication device such as a mobile phone, laptop computer, or various other data devices such as PDAs, etc. The functionality of these additional devices may be controlled by the use of restriction database servers and/or position determining facilities either at on-location locations or in the cell phone network or both.

I claim:

1. A method of operating a cell phone network to control the functionality of cell phones having a plurality of possible cell phone geographical locations; said method comprising the steps of:

creating a restriction data base stored in a restriction server defining restrictions associated with said plurality of geographical locations;

some of said geographical locations having an associated set of restrictions in said restriction data base;

each set of restrictions specifying one or more cell phone functions to be controlled;

creating a position data base stored in a position server separate from said restriction server and adapted to retrieve information regarding the present geographical position of a cell phone requiring service;

determining that said cell phone requiring service is in a restricted location;

coadjuvantely operating said restriction data base and said position server to determine the restrictions applicable to the present geographical location of said cell phone requiring service in a restricted location;

transmitting said determined restrictions to said cell phone requiring service in a restricted location; and controlling the operation of each said cell phone in said restricted location to inhibit cell phone functions specified by said determined restrictions.

2. The method of claim 1 wherein said step of controlling includes the step of causing said cell phone to indicate the functions specified by said transmitted restrictions.

3. The method of claim 1 wherein said step of controlling includes the step of selectively enabling or inhibiting the cell phone the functions specified by said transmitted restrictions.

4. The method of claim 1 wherein said step of controlling includes the step of:

displaying on said cell phone the functions specified by said transmitted restrictions, and selectively enabling or inhibiting the cell phone functions specified by said transmitted restrictions.

5. The method of claim 1 wherein said step of coadjuvantly operating said restriction database and said position server comprises the steps of:

receiving the telephone number representing they mobile ID of said cell phone requiring service in a restricted location;

operating said position server in response to said reception of said telephone number to determine the geographic coordinates of the present location of said cell phone;

applying said determined geographic coordinates to an address input of said restriction database; and reading out said restriction database to determine the restrictions applicable to said restricted location of cell phone.

6. The method of claim 1 including the step of operating a triangulation apparatus to determine said cell phone location.

7. The method of claim 1 including the step of operating a global positioning system apparatus to determine said cell phone location.

8. The method of claim 1 wherein:
said cell phone network has a plurality of possible geographical cell phone locations and a corresponding plurality of local restriction data bases each unique to one of said locations; said method includes the further steps of:
entering into each local restriction data base the restrictions applicable to the location associated with said each local restriction data base;
operating a local or low power transmitter coupled to each said local restriction data base for transmitting restrictions to cell phones currently in the location associated with said local restriction data base; and
controlling each active cell phone in said location to enable/disable the features of said cell phone specified by said transmitted restrictions.

9. The method of claim 3 wherein said cell phone functions comprise one or more functions selected from the group of:
ringer control;
speaker phone control;
camera phone control;
call initiation control;
call receiving control;
dictation control;
recording control;
internet access control; and
cell phone activation control.

10. A cell phone network adapted to control the functionality of cell phones having a plurality of possible cell phone geographical locations; said network comprising:
a restriction data base stored in a restriction server defining restrictions associated with said plurality of geographical locations;
some of said geographical locations having an associated set of restrictions in said restriction data base;
each set of restrictions specifying one or more cell phone functions to be controlled;
a position data base stored in a position server separate from said restriction server and adapted to retrieve information regarding the present geographical position of a cell phone requiring service;
apparatus that determines that said cell phone requiring service is in a restricted location;
said restriction data base and said position server are jointly effective to determine the restrictions applicable to the present geographical location of said cell phone requiring service in a restricted location;
apparatus that transmits said determined restrictions to said cell phone requiring service; and
apparatus that controls the operation of each said cell phone in said restricted location to inhibit cell phone functions specified by said determined restrictions.

11. The cell phone network of claim 10 including apparatus that causes said cell phone to indicate the functions specified by said transmitted restrictions.

12. The cell phone network of claim 10 including apparatus that controls said cell phone to selectively enable or inhibit the functions specified by said transmitted restrictions.

13. The cell phone network of claim 10 further including:
apparatus that controls said cell phone to display the functions specified by said transmitted restrictions; and
apparatus that selectively enables or inhibits the cell phone functions specified by said transmitted restrictions.

14. The apparatus of claim 10 further comprising:
apparatus that receives the telephone number representing the mobile ID of said cell phone requiring service in a restricted location;
apparatus responsive to the receipt of said telephone number for operating said position server to determine the geographic coordinates of the present location of said cell phone;
apparatus that applies said determined geographic coordinates to an address input of said restriction database; and
apparatus that reads out said restriction database to determine the restrictions applicable to said restricted location of cell phone.

15. The cell phone network of claim 10 including triangulation apparatus adopted to determine said cell phone location.

16. The cell phone network of claim 10 including a global positioning system apparatus adopted to determine said cell phone location.

17. The cell phone network of claim 10 further including:
a plurality of possible geographical cell phone locations and a corresponding plurality of local restriction data bases each unique to one of said locations;
apparatus that enters into each local restriction data base the restrictions applicable to the location associated with said each local restriction data base;
a local or low power transmitter coupled to each said local restriction data base and operable for transmitting restrictions to cell phones currently in the location associated with said local restriction data base; and
apparatus for controlling each active cell phone in said location to enable/disable the features of said cell phone specified by said transmitted restrictions.

18. The cell phone network of claim 12 wherein said cell phone functions comprise one or more functions selected from the group of:
ringer control;
speaker phone control;
camera phone control;
all initiation control;
call receiving control;
dictation control;
recording control;
internet access control; and
cell phone activation control.

* * * * *